Figure 3A:
Figure 3B:
Figure 3C:
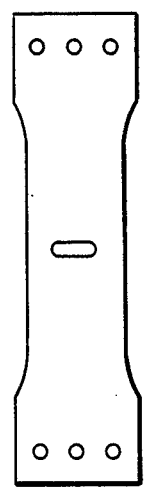
Figure 3D:
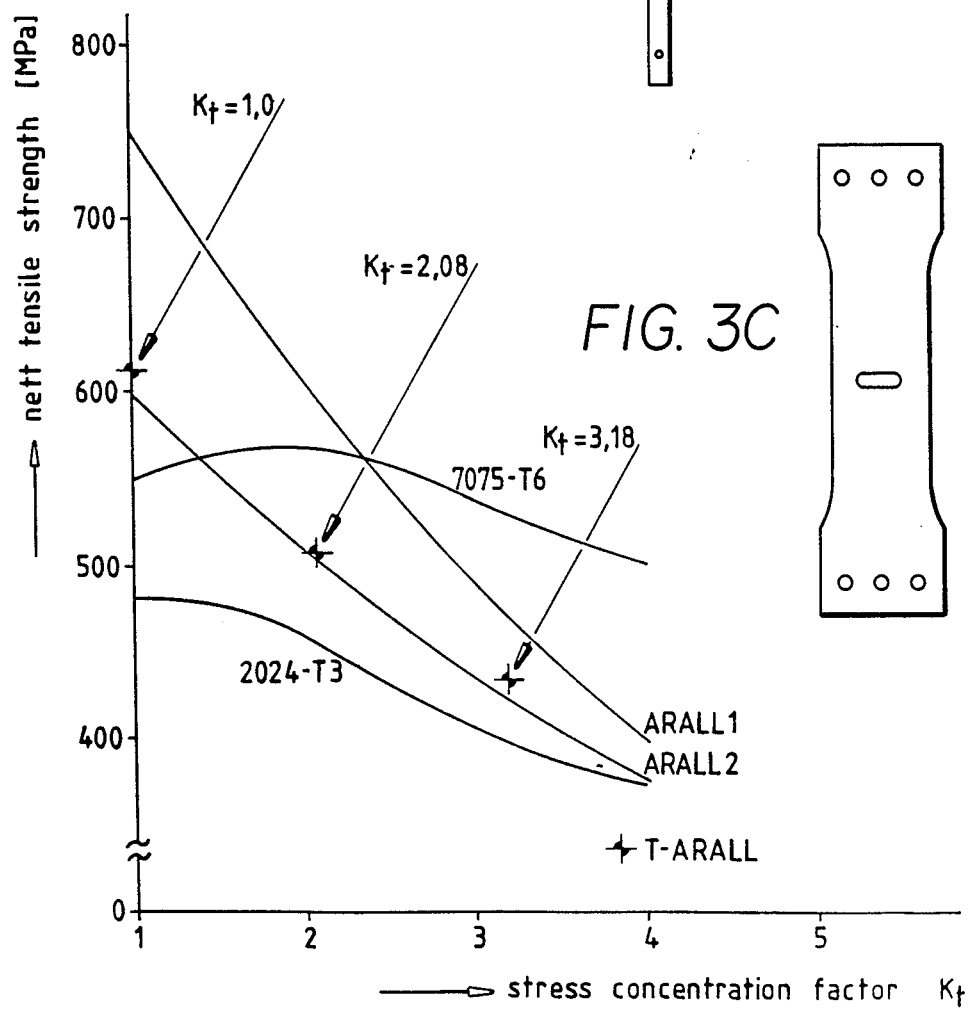

United States Patent [19]

Gunnink

[11] Patent Number: 4,935,291

[45] Date of Patent: Jun. 19, 1990

[54] COMPOSITE LAMINATE OF METAL SHEETS AND CONTINUOUS FILAMENTS-REINFORCED SYNTHETIC LAYERS

[75] Inventor: Jan W. Gunnink, Kapelle aan de Ijssel, Netherlands

[73] Assignee: Akzo nv, Arnhem, Netherlands

[21] Appl. No.: 291,591

[22] Filed: Dec. 29, 1988

[30] Foreign Application Priority Data

Dec. 31, 1987 [NL] Netherlands .................. 8703164

[51] Int. Cl.$^5$ .................................................. B32B 7/02
[52] U.S. Cl. ........................................... 428/213; 428/
[58] Field of Search ............... 428/114, 109, 110, 285, 428/284, 294, 297, 457, 213

[56] References Cited

U.S. PATENT DOCUMENTS 4,500,589 2/1985 Schijve et al. ...................... 428/213

Primary Examiner—James J. Bell
Attorney, Agent, or Firm—Stevens, Davis, Miller & Mosher

[57] ABSTRACT

Fatigue- and flutter- resistant laminate, suitable for use as constructional material in aviation, particularly in the construction of wings. It comprises (I) a laminated cover having a constant thickness and consisting of at least two metal plates firmly interbonded by an intermediate resinous layer reinforced with continuous strands, a substantial proportion of which extends mutually parallel in at least one direction, and (II) a substrate which is firmaly bonded thereto, and comprises at least one metallic support plate having a tapering thickness. (I) and (II) may be interbonded by means of an optionally fiber-reinforced resin. (I) may be present on both sides of (II). Preferably, the minimum thickness of (II) is at least equal to the thickness of the metal plates present in (I). More particularly, the thickness of (II), tapers from 11 to 1 mm (over a length of at most 20 m).

20 Claims, 3 Drawing Sheets

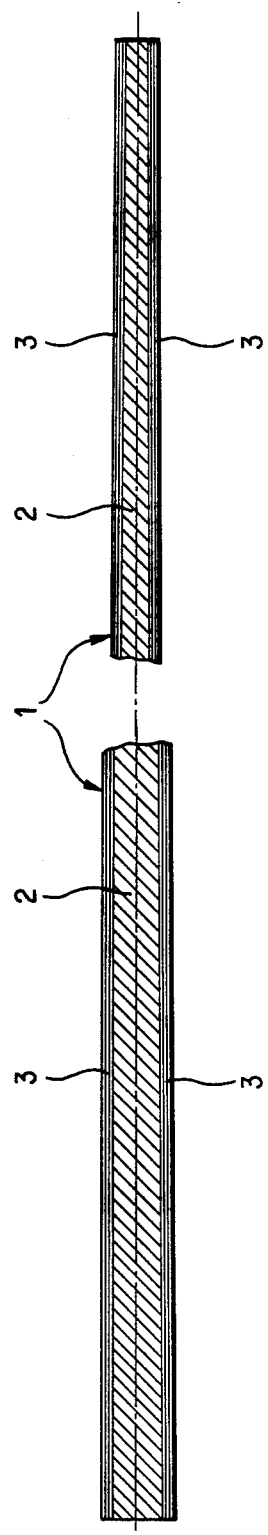
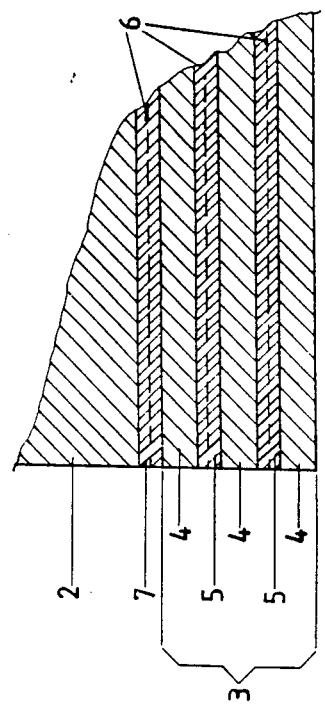
FIG. 1
FIG. 2

COMPOSITE LAMINATE OF METAL SHEETS AND CONTINUOUS FILAMENTS-REINFORCED SYNTHETIC LAYERS

The invention relates to a composite laminate composed of a covering laminate of constant thickness and of at least two metal sheets, between which there is provided a continuous filaments-containing synthetic layer bonded to the metal sheets, a large number of the continuous filaments being disposed in parallel lines in one direction at least.

Such a laminate is known from EP 0 056 289-B1. With this laminate known as ARALL ®particularly favourable results have been attained so far in applications, such as aircraft and spacecraft, where favourable fatigue properties are of importance because of the influence of a varying load. However, design studies on wings of large transport aircraft indicate that the favourable properties of the ARALL ® laminates cannot always be taken full advantage of. Three reasons can be given for this, viz., firstly, the impossibility in actual practice of tapering the ARALL ®laminates lengthwise. The loads on a wing decrease from root to tip. Equally, the amount of material needed to absorb the loads decreases from root to tip. As in the case of the well-known ARALL ®laminate the thickness chosen will be constant, the tapering required in the cross-section can only be realized by a specific stepwise variation in the thickness of the ARALL ®laminate. However, each stepwise change in thickness requires the use of a joint. The resulting drawback will be the higher weight of the structure, which will moreover be more intricate and costly.

A second reason for the favourable properties of ARALL ®laminates not always being taken full advantage of lies in the relatively low load bearing capacity of ARALL ®. For large and relatively heavy aircraft a large part of the wing will be designed for high panel loads. As panels of ARALL ®laminates have finite dimensions which are often many times smaller than the wing-span, aircraft wings will be built up of several panels. In actual practice, these panels will always be jointed mechanically. For these joints it is of importance that the material should have a high load bearing capacity. This in combination with the high panel loads results in a weight increase for the structure when effecting mechanical joints.

A third reason why the favourable properties of ARALL ® laminates are not always taken full advantage of lies in the relatively low shear modulus G of ARALL ®, which causes the torsional stiffness of wings of aircraft with swept-back wings to be so much reduced that when all other design requirements are met, the wings become flutter critical. Such a drawback may be overcome by using an ARALL ® laminate of greater thickness, which is comparatively expensive and leads to weight increments. It should be noted that by flutter is meant the indifferent behaviour of the wing due to aerodynamic forces. In other words, excitations by aerodynamic forces are insufficiently damped but converge until, in the end, the wing will break.

The invention has for its object to provide a laminate of the type mentioned in the opening paragraph, in which the aforementioned drawbacks can be overcome. The composite laminate is characterized according to the invention in that the covering laminate built up of layers of constant thickness is provided on and bonded to at least one core sheet of metal which has a gradually changing thickness, and the minimum thickness of the core sheet is at least equal to the thickness of each of the metal sheets of the covering laminate, with the preferred minimum thickness of the core sheet being at least 1 mm according to the invention and the maximum thickness of the core sheet being 12 mm. In a favourable embodiment of the composite laminate according to the invention the thickness of the core sheet changes gradually by 11 mm at most over a sheet length of 20 m at most and this gradual change in thickness of the core sheet is in the longitudinal direction of continuous essentially parallel filaments in the covering laminate. The preferred embodiment is characterized according to the invention in that to either side of the core sheet there is attached a covering laminate and the thickness of the core sheet is reduced gradually, preferably rectilinearly, and to an equal extent on either side from a greater thickness at one sheet end to a smaller thickness at the other sheet end.

According to the invention, the core sheet may be effectively bonded to the covering laminate by a synthetic layer that may be reinforced with continuous filaments. The laminate according to the invention is with advantage characterized in that the elongation at rupture of the continuous filaments is 0,5 to 8%, the modulus of elasticity is 50–450 GPa, the diameter of the continuous filaments is 5–25 $\mu$m, more particularly 8–12 $\mu$m, and the continuous filaments are selected from the following group of materials: aramids, more particularly poly-paraphenylene terephthalamide (PPDT), glass, more particularly E-glass, R-glass, or $S_2$-glass, and carbon.

The composite laminate according to the invention is with advantage characterized in that the metal sheets in the covering laminate and the core sheet are of a metal of which the tensile strength is at least 0,20 GPa and which is selected from the following group of materials: aluminium, aluminium alloys, more particularly aluminium-copper alloys, such as those of the AA(USA) No. 2024 type or aluminium-zinc alloys, such as those of the AA(USA) No. 7075 type, steel, titanium alloys and copper, and in addition according to the invention the thickness of each of the metal sheets in the covering laminate is less than 1,5 mm, more particularly 0,1–0,8 mm, and the number of metal sheets in a covering laminate is 2–6, there being provided between every two successive metal sheets a continuous filaments-containing synthetic layer in which there is such an amount of filaments that they constitute 35 to 75% by volume, more particularly 40–65% by volume, of the total volume of synthetic material and filaments combined.

In the use of the composite laminate according to the invention for structures, more particularly aircraft wings and beams subject to bending, said tapering of a sheet-shaped laminate may be realized in a simple and effective manner by the thickness of the core sheet being reduced gradually, more particularly linearly, from a greater thickness at one sheet end to a smaller thickness at the other sheet end. As a result, covering laminates of conventional ARALL ® may be used which have a constant thickness throughout the length of an aircraft wing, so that the aforementioned difficult and costly stepwise changes in thickness can be omitted.

Another advantage of the composite laminate according to the invention is that there may be obtained in a simple manner a flat laminate having a sufficiently high permissible load bearing capacity lengthwise and width-wise if use is made of a core sheet of sufficient thickness. As a result, the composite laminate according to the invention will permit the ready realization of mechanical joints, such as riveted and bolted joints, the use being maintained of a covering laminate of the conventional ARALL ® in which the thickness of the metal sheets is smaller than 1 mm.

In addition the invention permits the realization of a composite laminate having a relatively high shear modulus G by using a sufficiently thick core sheet in combination with a conventional relatively thin ARALL ® layer for a covering laminate.

In the composite laminate according to the invention the synthetic layer may with advantage be of a non-thermoplastic but thermosetting synthetic material, such as epoxy resin, unsaturated polyester resin, vinyl esters, or phenol resins. Depending on the desired application in the composite laminate according to the invention the synthetic layer may be of a thermoplastic synthetic material.

A preferred embodiment of the composite laminate is characterized according to the invention in that a pre-stressed covering laminate is employed, more particularly a covering laminate in which in the externally unloaded state of the laminate in its entirety there is an internal compressive stress in the metal sheets and a tensile stress in the continuous filaments. The pre-stressing of the ARALL ® laminates is known in itself from EP 0 056 288-B1.

FIGS. 1 and 2 are schematic illustrations of some embodiment of the composite laminate according to the invention.

In FIG. 1 the composite laminate is generally referred to by the numeral 1. The composite laminate 1 is built up of a solid core sheet 2 having a wedge-shaped cross-section. The core sheet 2 of aluminium-copper alloy of the AA(USA) No. 2024 type is clad on either side with a covering laminate 3, which has a constant thickness throughout the length of the laminate 1. In the drawn embodiment the thickness of the core sheet 2 decreases linearly from a greater thickness of 7 mm at the one sheet end to a lesser thickness of 3 mm at the other sheet end throughout the length of, say, 18 m of the composite laminate. The part of the composite laminate encircled in FIG. 1 is reproduced highly magnified in FIG. 2. The covering laminates 3 are each composed of said standardized ARALL ®, which is described in detail in EP 0 056 289-B1. Each covering laminate 3 is built up of three metal sheets 4 of aluminium-zinc alloy of the AA(USA) No. 7075-T₆ type with a constant thickness of 0.3 mm. Between every two aluminium sheets 4 there is provided an 0.2 mm-thick prepreg 5, which is composed of a very large number of parallel, i.e. unidirectional, continuous filaments 6 of PPDT with a diameter of 12 μm, which filaments are impregnated with a synthetic material based on epoxy resin. Each of the covering laminates 3 is bonded to the core sheet 2 by means of a prepreg 7, which is fully identical with the prepreg 5. In each prepreg the continuous filaments constitute about 50% by volume of the total volume of synthetic material and filaments combined.

To illustrate the favourable effect of the composite laminate according to the invention the results are given in the table below of determining the shear modulus G and the bearing strength P for the composite laminate according to the invention, referred to as T-ARALL ®, and the conventional ARALL ® laminate, referred to as ARALL ®-1.

TABLE

|  | ARALL ®-1 metal sheets of aluminium-zinc alloy AA No. 7075-T₆ | T-ARALL ® according to the invention; covering laminates of ARALL ®-1 | | Improvement of T-ARALL ® compared to ARALL ®-1 on percentage basis |
|---|---|---|---|---|
|  |  | Core sheet of Al.-copper alloy No. 2024-T₃ | Core sheet of Al.-zinc alloy No. 7075-T₆ |  |
| Shear modulus (GPa) | 17–18 | 23–25 | 22–24 | about 50% |
| Load bearing capacity at rupture (MPa) | 630–680 | 750–820 | 850–950 | about 40% |
| Load bearing capacity at a plastic deformation of 0,2% (MPa) | 480–520 | 550–590 | 660–730 | about 40% |
| Total thickness (mm) | 6,8 | 7,0 | 7,0 |  |

The table clearly shows that both the shear modulus and the load bearing capacity are considerably more favourable in the T-ARALL ® composite laminate according to the invention than in the conventional ARALL ®-1 laminate of virtually the same total thickness.

The ARALL ®-1 laminate mentioned in the table was composed of 14 sheets of the indicated aluminium-zinc alloy of a thickness each of 0,3 mm, bonded together by 13 interposed prepregs of a thickness each of 0,2 mm and composed of unidirectional continuous PPDT filaments having a thickness of 12 μm impregnated with a thermosetting resin based on epoxy resin.

For the two types of T-ARALL ® according to the invention given in the table use was made of a core sheet 4 mm thick and of the two aluminium alloys indicated. This core sheet was covered on either side with said ARALL ®-1 laminate consisting of three sheets of said aluminium-zinc alloy with a prepreg provided in between every two successive metal sheets.

In FIG. 3 the blunt notch behaviour of T-ARALL ® laminate according to the invention is compared with the blunt notch behaviour of several other materials, viz., the conventional ARALL ®-1 and ARALL ®-2 laminates as well as solid sheets of aluminium-zinc alloy of the AA(USA) No. 7075-T6 type and aluminium-copper alloy of the AA(USA) No. 2024-T3 type. By the blunt notch behaviour of a structural component is meant the influence on the tensile strength of a distortion in the structure of the material. Since distortions in the material, such as bolt holes, passages for cables or lines will occur frequently in actual practice, the blunt notch behaviour of a material plays an important role. In FIG. 3 the nett tensile strength in MPa is plotted on the ordinate and on the abscissa is plotted the magnitude of the stress concentration factor $K_t$, which is calculated by conventional prior art methods using the formula $$K_t = \frac{\sigma_{peak}}{\sigma_{nominal}},$$

wherein $\sigma_{peak}$ = the peak stress in the sheet material at the end of the distortion, which may for instance be in the shape of an annular hole or a slit.

$\sigma_{nominal}$ = the tensile stress at the distortion calculated from the tensile strength divided by the remaining (nominal) surface area of the cross-section of the test bar at the distortion.

In FIG. 3 the blunt notch behaviour for the ARALL ®-1, ARALL ®-2 materials, and the 2024-T$_3$ and 7075-T$_6$ aluminium alloys is indicated with full lines. The blunt notch behaviour for the composite T-ARALL ® laminate according to the invention is indicated in FIG. 3 with three crosses for different values of the stress factors, namely $K_t=1$, $K_t=2,08$, and $K_t=3,18$.

The ARALL ®-1 laminate of FIG. 3 is of the same composition and total thickness as listed for the ARALL ®-1 laminate in the table above. The ARALL ®-2 laminate of FIG. 3 is of the same construction and total thickness as ARALL ®-1, except that for ARALL ®-2 the 14 metal sheets are of aluminium-copper alloy of the AA(USA) No. 2024-T$_3$ type. The solid sheets of the 2024-T$_3$ and 7075-T$_6$ aluminium alloys each had a total thickness of 4,0 mm. The composite T-ARALL ® laminate in FIG. 3 is of the same composition and total thickness as listed for the T-ARALL ® in the table above, the core sheet being of aluminium-copper alloy of the AA(USA) No. 2024-T$_3$ type.

FIG. 3 serves to illustrate that the blunt notch behaviour of said T-ARALL ® laminate according to the invention is between that of the conventional ARALL ®-1 and ARALL ®-2 laminates. In other words, the blunt notch behaviour of the composite T-ARALL ® laminate according to the invention should be qualified as favourable, the permissible load bearing capacity and shear modulus (see table) being superior to those of the ARALL ®-1 laminate.

Figures 4A, 4B:
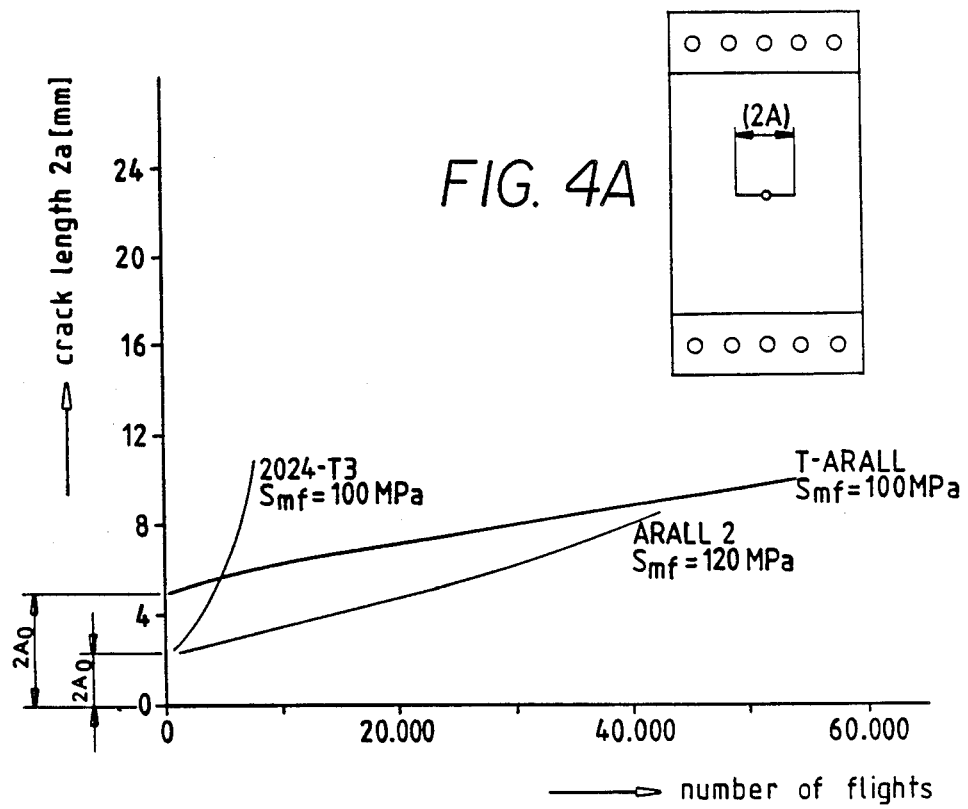

In FIG. 4 the results are compared for three different materials of the crack propagation rate resulting from fatigue. The fatigue tests were carried out applying a varying load in accordance with a flight simulation programme standardized in aircraft engineering. In all tests use was made of the test specimens shown in FIG. 4 which prior to the test were provided with a saw cut of $2A_o = 3$ mm or 5 mm in length. In FIG. 4 are also given the mean flight stress values (Smf) at which the different materials were tested. The number of simulated flights is plotted on the abscissa in FIG. 4 and the crack length in the test specimen in mm on the ordinate. The line indicated with 2024-T$_3$ in FIG. 4 refers to test specimens of a solid sheet of aluminium-copper alloy of the AA(USA) No. 2024-T$_3$ type. The line indicated with ARALL ®-2 in FIG. 4 refers to a test specimen of a laminate of the same composition and total thickness as described for FIG. 3. The line indicated with T-ARALL ® in FIG. 4 refers to test specimens of the composite laminate according to the invention of the same composition and total thickness as described for FIG. 3.

From FIG. 4 it may be concluded that the fatigue behaviour of the composite laminate according to the invention may also be considered to be favourable. All the described tests using conventional ARALL ®-1 test specimens were conducted on pre-stressed ARALL ® laminates, the ARALL ®-2 test specimens originating from non-pre-stressed ARALL ® laminates. The covering laminates in the composite T-ARALL ® laminate according to the invention were pre-stressed laminates.

If the synthetic material used in the prepregs in the laminates is a thermoplastic synthetic material, use may be made of an essentially amorphous thermoplastic synthetic material, preferably having a glass transition temperature above 80° C., more particularly above 140° C. or 160° C., such as polyarylate (PAR), polysulphone (PSO), polyethersulphone (PES), polyetherimide (PEI), or polyphenylene ether (PPE), more particularly poly-2,6 dimethyl phenylene ether.

Also, the synthetic material may with advantage be of a semi-crystalline thermoplastic synthetic material. Alternatively, there may be employed a semi-crystalline or para-crystalline thermoplastic synthetic material having a crystalline melting point above 130° C., preperably above 270° C., such as polyphenylene sulphide (PPS), polyether ketones, more particularly polyetherether ketone (PEEK), polyether ketone (PEK), and polyether ketone-ketone (PEKK), liquid crystal polymers, such as XYDAR of Dartco composed of the monomers bisphenol, terephthalic acid, and hydroxybenzoic acid.

As regards the properties of several of the continuous reinforcing filaments that may be employed in the laminates to be manufactured according to the invention, reference is made to the article by Kh. Hillermeier and H.G. Weijland: "An aramid yarn for reinforcing plastics", Plastica, November 1977, No. 11, pp. 374–380. Filaments of S$_2$-glass essentially have the same properties and composition as filaments of S-glass. For the properties and the composition of E-glass, R-glass, and S- or S$_2$-glass reference is made to the table on p. 29 of K.L. Loewenstein's book, The Manufacturing Technology of continuous glass fibres, Elsevier Scientific Publishing Company, 1973, and also to Table 1 on p. 33 of K.A.F. Schmidt's book, Textilglas fur die Kunststofverstarkung, Zechner & Huthig Verlag GmbH, 1972.

Whenever mention is made in the description of the modulus of elasticity or the tensile strength of the continuous filaments, reference is made to the virgin value at tensile load in the longitudinal direction of the filament and measured on a single filament containing no adhesives, i.e. a virgin filament, the measurements being carried out in accordance with ASTM No. D 3379-75.

The aforementioned glass transition point Tg of said essentially amorphous thermoplastic synthetic materials should be measured using a Rheometrics dynamic mechanical measuring device of the RDA-700 type at a frequency of 1 Hertz and a heating rate of 2° C. per minute at most. Tg is the temperature at which there is a maximum damping modulus G".

The aforementioned crystalline melting point Tm of the semi-crystalline thermoplastic synthetic materials is determined by Differential Scanning Calorimetry (DSC). This determination is carried out with the Perkin Elmer DSC-7 type measuring apparatus at a heating rate of 20 C per minute. $T_m$ is defined as the peak maximum of the endo-thermical peak in the DSC curve. Within the scope of the invention various modifications may be made. Optionally, the synthetic layer may contain some conventional additives, such as fillers. The continuous reinforcing threads or filaments in the synthetic layers may extend parallel to each other in one direction, i.e. be disposed unidirectional. Alternatively, there may be employed two groups of reinforcing filaments. Each group will then comprise a very large number of parallel filaments, the threads or filaments of the one group extending at right angles to the filaments of the other group. Such an arrangement may for instance be realized by providing the filaments of the two groups in the form of a fabric or a deposition or web. The change in thickness of the core sheet may in principle be linear or curved.

I claim:

1. A composite laminate composed of:
   a covering laminate of constant thickness comprising at least two metal sheets, between which there is provided a continuous filaments-containing synthetic layer bonded to the metal sheets, in which layer a large number of the continuous filaments are disposed in parallel lines in one direction at least;
   a base sheet of metal having a gradually changing thickness with the base sheet covered on at least one side with the covering laminate, which is bonded to the base sheet.

2. A laminate according to claim 1, characterized in that the core sheet is bonded to the covering laminate by a synthetic layer.

3. A laminate according to claim 2, characterized in that the synthetic layer between the covering laminate and the core sheet is reinforced with continuous filaments.

4. A laminate according to claim 1, characterized in that to either side of the core sheet there is attached a covering laminate.

5. A laminate according to claim 1, characterized in that the minimum thickness of the core sheet is at least equal to the thickness of each of the metal sheets of the covering laminate.

6. A laminate according to claim 1, characterized in that the minimum thickness of the core sheet is at least 1 mm.

7. A laminate according to claim 1, characterized in that the maximum thickness of the core sheet is 12 mm.

8. A laminate according to claim 1, characterized in that the thickness of the core sheet changes gradually by 11 mm at most over a sheet length of 20 m at most.

9. A laminate according to claim 1, characterized in that the gradual change in thickness of the core sheet is in the longitudinal direction of continuous essentially parallel filaments in the covering laminate.

10. A laminate according to claim 1, characterized in that the elongation at rupture of the continuous filaments is 0,5 to 8% and the modulus of elasticity 50-450 GPa.

11. A laminate according to claim 1, characterized in that the continuous filaments are of a material selected from the following group of materials: aramids, more particularly poly-paraphenylene terephthalamide (PPDT), glass, more particularly E-glass, R-glass, or $S_2$-glass, and carbon.

12. A laminate according to claim 1, characterized in that the diameter of the continuous filaments is 5-25 μm, more particularly 8-12 μm.

13. A laminate according to claim 1, characterized in that the metal sheets in the covering laminate and the core sheet are of a metal of which the tensile strength is at least 0,20 GPa and which is selected from the following group of materials: aluminium, aluminium alloys, more particularly aluminium-copper alloys, such as those of the AA(USA) No. 2024 type or aluminium-zinc alloys, such as those of the AA(USA) No. 7075 type, steel, titanium alloys, and copper.

14. A laminate according to claim 1, characterized in that the thickness of each of the metal sheets in the covering laminate is smaller than 1,5 mm, more particularly 0,1-0,8 mm, and the number of metal sheets in a covering laminate is 2-6, there being provided between every two successive metal sheets a continuous filaments-containing synthetic layer.

15. A laminate according to claim 1, characterized in that in a synthetic layer there is such an amount of filaments that they constitute 35 to 75% by volume, more particularly 40-65% by volume, of the total volume of synthetic material and filaments combined.

16. A laminate according to claim 1, characterized in that the synthetic layer is of a non-thermoplastic synthetic material, such as epoxy resin, unsaturated polyester resin, vinyl esters, or phenol resins.

17. A laminate according to claim 1, characterized in that the synthetic layer is of a thermoplastic synthetic material.

18. A laminate according to claim 1, characterized in that a pre-stressed covering laminate is employed, more particularly a covering laminate in which in the externally unloaded state of the laminate in its entirety there is an internal compressive stress in the metal sheets and a tensile stress in the filaments.

19. A wing, more particularly an aircraft wing, characterized in that it is built up at least in part of a laminate according to one or more of the claims 1-18.

20. A laminate according to claim 1, characterized in that the base sheet of metal having a gradually changing thickness is wedge-shaped.

* * * * *